US010834282B2

(12) United States Patent
Ooki

(10) Patent No.: US 10,834,282 B2
(45) Date of Patent: Nov. 10, 2020

(54) IMAGE SHADING CORRECTION BASED ON PRINTER COVER BEING OPEN OR CLOSED

(71) Applicant: CANON KABUSHIKI KAISHA, Tokyo (JP)

(72) Inventor: Kenji Ooki, Sodegaura (JP)

(73) Assignee: Canon Kabushiki Kaisha, Tokyo (JP)

( * ) Notice: Subject to any disclaimer, the term of this patent is extended or adjusted under 35 U.S.C. 154(b) by 102 days.

(21) Appl. No.: 16/200,454

(22) Filed: Nov. 26, 2018

(65) Prior Publication Data

US 2019/0174019 A1 Jun. 6, 2019

(30) Foreign Application Priority Data

Dec. 5, 2017 (JP) ................................. 2017-233388

(51) Int. Cl.
*H04N 1/00* (2006.01)
*H04N 1/407* (2006.01)
*H04N 1/401* (2006.01)

(52) U.S. Cl.
CPC ..... *H04N 1/00681* (2013.01); *H04N 1/00031* (2013.01); *H04N 1/00034* (2013.01); *H04N 1/00039* (2013.01); *H04N 1/00087* (2013.01); *H04N 1/00588* (2013.01); *H04N 1/401* (2013.01); *H04N 1/4076* (2013.01)

(58) Field of Classification Search
CPC .. H04N 1/00681; H04N 1/401; H04N 1/4076; H04N 1/00087; H04N 1/00034
See application file for complete search history.

(56) References Cited

U.S. PATENT DOCUMENTS

| 8,587,843 B2 | 11/2013 | Enami et al. ................. 358/475 |
| 9,467,584 B2 | 10/2016 | Ooki ................... H04N 1/00814 |
| 2008/0138093 A1* | 6/2008 | Son ......................... G03G 15/50 399/9 |
| 2017/0208209 A1* | 7/2017 | Sato .................... H04N 1/00034 |

FOREIGN PATENT DOCUMENTS

JP 2011-023990 2/2011

* cited by examiner

*Primary Examiner* — Eric A. Rust
(74) *Attorney, Agent, or Firm* — Venable LLP

(57) ABSTRACT

Provided is an image reading apparatus configured to avoid unnecessarily performing shading correction processing. The image reading apparatus detects whether or not an original is placed on an original tray when detecting an open state of an ADF and then detecting a closed state thereof. In a case where the original is placed on the original tray, the image reading apparatus performs shading correction for flow reading, and in a case where no original is placed on the original tray, the image reading apparatus performs shading correction for platen cover reading.

3 Claims, 12 Drawing Sheets

IMAGE SHADING CORRECTION BASED ON PRINTER COVER BEING OPEN OR CLOSED

BACKGROUND OF THE INVENTION

Field of the Invention

The present disclosure relates to an image reading apparatus and image reading method configured to read an image (original image) from an original.

Description of the Related Art

An image reading apparatus performs a scanning operation involving, while an original placed on a platen glass is pressed by a platen cover, reading an original image on the original one line by one line by an image sensor. The scanning operation performed while the original is placed on the platen glass as described above is hereinafter referred to as "platen cover reading". In the platen cover reading, the image sensor reads the original image while moving in a direction orthogonal to a scanning direction.

An image forming apparatus including an automatic document feeder (ADF) performs a scanning operation involving reading an original image on an original by an image sensor fixed at a predetermined position (hereinafter referred to as "flow reading position") while originals are conveyed one by one. The scanning operation performed while the originals are conveyed as described above is hereinafter referred to as "flow reading". In the flow reading, a plurality of originals are successively fed from an original tray of the ADF. Therefore, the image sensor can successively read the original images on the plurality of originals.

In such an image reading apparatus, there is a demand by users for reduction of processing time required from the start of reading of the first original to the output of image data representing the read original image. As preparation before reading the original image, the image reading apparatus acquires shading correction data to be used for shading correction. The shading correction data is data for correcting a difference between reference data and a reading result obtained by the image sensor reading a reference white plate provided in the image reading apparatus. The image reading apparatus acquires the shading correction data at a stage of preparing for image reading to reduce the processing time. A trigger for acquiring the shading correction data at the stage of preparing for image reading is detection of the change of the platen cover from an open state to a closed state in the case of platen cover reading (Japanese Patent Application Laid-open No. 2011-023990), and is detection of placement of the original onto the original tray in the case of flow reading (U.S. Pat. No. 8,587,843 (B2)).

The related-art image reading apparatus performs the processing of acquiring the shading correction data every time the trigger occurs. The reference data for platen cover reading and the reference data for flow reading are separately prepared. Therefore, the processing of acquiring the shading correction data is performed for each of the reference data for platen cover reading and the reference data for flow reading. In this case, the processing of acquiring the shading correction data may be unnecessarily performed as follows.

For example, when jamming occurs and the platen cover is opened and closed for recovery, the trigger occurs, and thus the processing of acquiring the shading correction data for platen cover reading is performed.

Further, for example, after the original is placed on the original tray of the ADF, when the ADF is opened and closed to check whether the original is left on the platen glass, both of the processing of acquiring the shading correction data for flow reading and the processing of acquiring the shading correction data for platen cover reading are performed. When the image reading apparatus detects placement of the original onto the original tray of the ADF and the change of the platen cover from the open state to the closed state, the image reading apparatus first performs the processing of acquiring the shading correction data for platen cover reading. The image reading apparatus performs the processing of acquiring the shading correction data for flow reading after the processing of acquiring the shading correction data for platen cover reading is ended.

In both of the cases, the processing of acquiring the shading correction data for platen cover reading is unnecessarily performed. The unnecessarily-performed processing of acquiring the shading correction data for platen cover reading causes increase in processing time and hinders high-speed image reading.

Further, the present invention has an object to provide an image reading apparatus capable of reading the first original at high speed without unnecessarily performing processing of acquiring shading correction data. The object can be achieved as described above.

SUMMARY OF THE INVENTION

An image reading apparatus according to the present disclosure includes an original table on which an original is to be placed; a document feeder configured to convey the original, the document feeder including: an original tray on which the original is to be placed; a first sensor configured to detect that the original is placed on the original tray; a conveyor configured to convey the original placed on the original tray; and a sheet discharge tray to which the original is to be discharged; a reference member; a second sensor configured to detect an open state and a closed state of the document feeder; a reading unit configured to read one of the original placed on the original table and the original to be conveyed by the document feeder, the reading unit being configured to read the original placed on the original table under a state in which the reading unit is moving a reading position in a first mode, and to read the original to be conveyed by the conveyor to a predetermined reading position in a second mode; an image processor configured to perform shading correction on image data output from the reading unit in the first mode with use of first shading correction data, and to perform shading correction on image data output from the reading unit in the second mode with use of second shading correction data; and a processor configured to generate one of the first shading correction data for the first mode and the second shading correction data for the second mode based on a result of reading the reference member by the reading unit, wherein, in a case where the first sensor detects that no original is placed on the original tray and the second sensor detects that the original table is changed from the open state, the processor generates the first shading correction data, and wherein, in a case where the first sensor detects that the original is placed on the original tray and the second sensor detects that the original table is changed from the open state, the processor is prevented from generating the first shading correction data.

Further features of the present invention will become apparent from the following description of exemplary embodiments (with reference to the attached drawings).

DESCRIPTION OF THE EMBODIMENTS

Now, preferred embodiments of the present disclosure are exemplarily described in detail with reference to the drawings.

Overall Configuration

Figure 1:
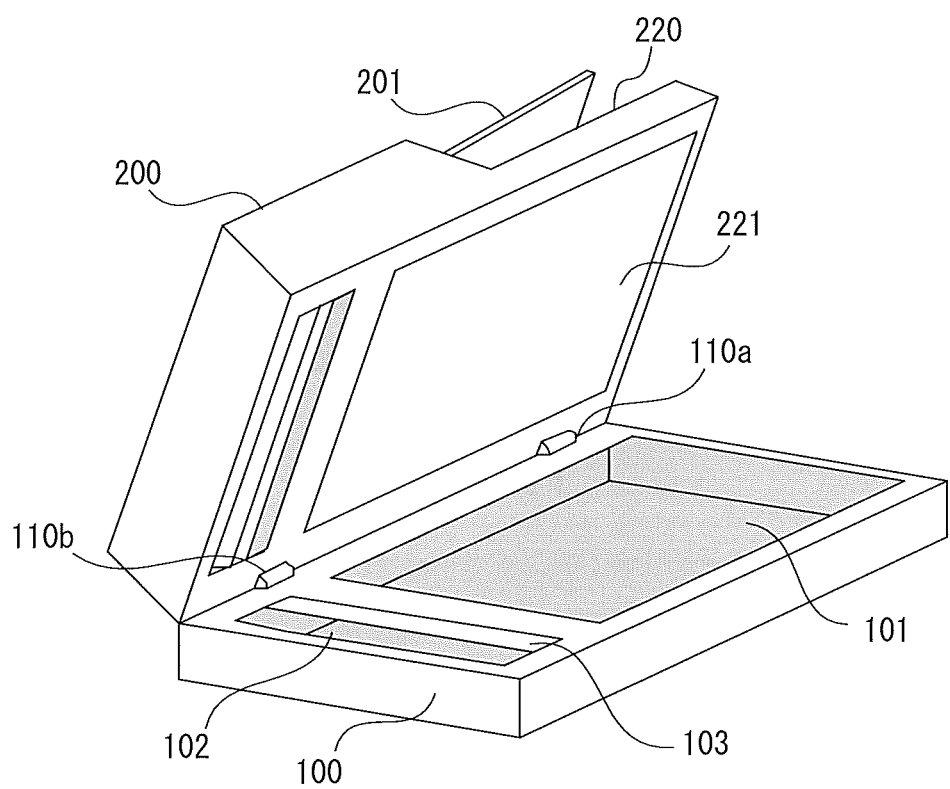
FIG. 1 is an exemplary configuration diagram for illustrating an image reading apparatus.

FIG. 1 is an exemplary configuration diagram for illustrating an image reading apparatus according to this embodiment. An ADF 200 serving as an automatic document feeder is mounted to an image reading apparatus 100. The ADF 200 is freely openable and closable with respect to the image reading apparatus 100 by open/close hinges 110a and 110b. The image reading apparatus 100 has a built-in controller to be described later. The image reading apparatus 100 includes an image sensor configured to read an original image on one surface (front surface) of an original. The ADF 200 includes an image sensor configured to read an original image on another surface (back surface) of the original.

On a surface of the image reading apparatus 100 opposed to the ADF 200, a platen glass 101 and a front-surface flow reading glass 102 are provided. A reference white plate 103 is provided on the front-surface flow reading glass 102. The reference white plate 103 is provided on the inner side of the image reading apparatus 100. The image sensor of the image reading apparatus 100 can read the reference white plate 103. The image sensor of the ADF 200 can read the reference white plate 103 through intermediation of the front-surface flow reading glass 102. The reference white plate 103 is read when shading correction data is to be generated.

The ADF 200 includes an original tray 201, on which sheet-like originals are to be placed, and a sheet discharge tray 220. On a surface of the ADF 200 opposed to the image reading apparatus 100, a platen cover white plate 221 is provided at a position of covering the platen glass 101. The ADF 200 discharges the originals placed on the original tray 201 one by one to the sheet discharge tray 220 via a reading position of the image sensor of the image reading apparatus 100 and a reading position of the image sensor of the ADF 200.

Figure 2A:
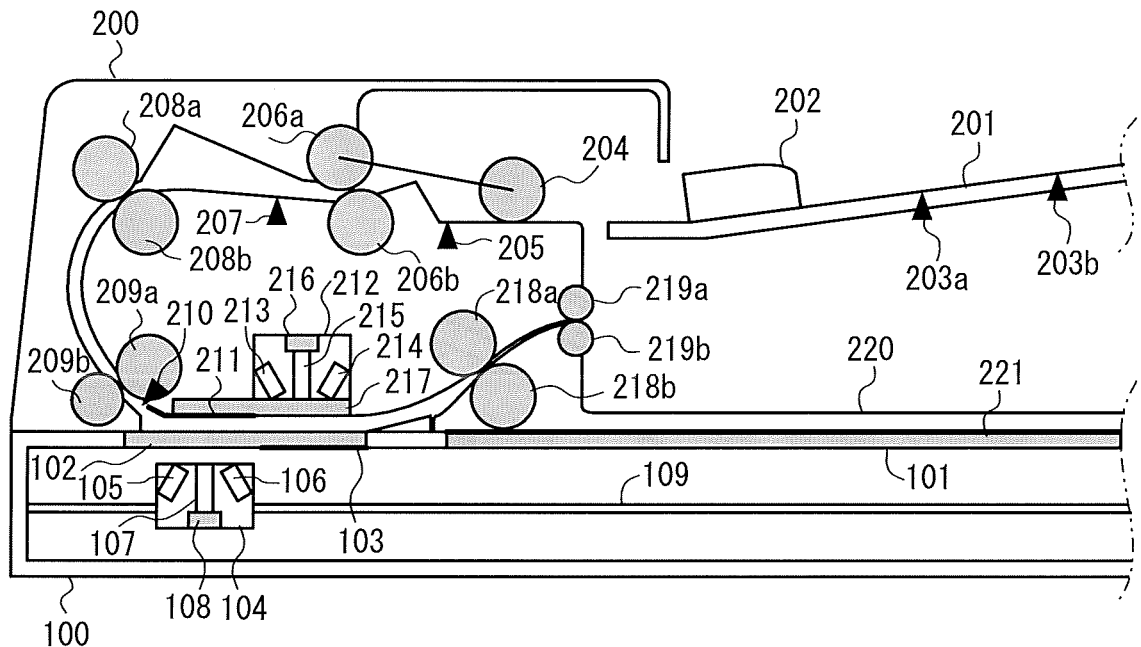
FIG. 2A and FIG. 2B are internal configuration diagrams for illustrating the image reading apparatus and an ADF.
Figure 2B:
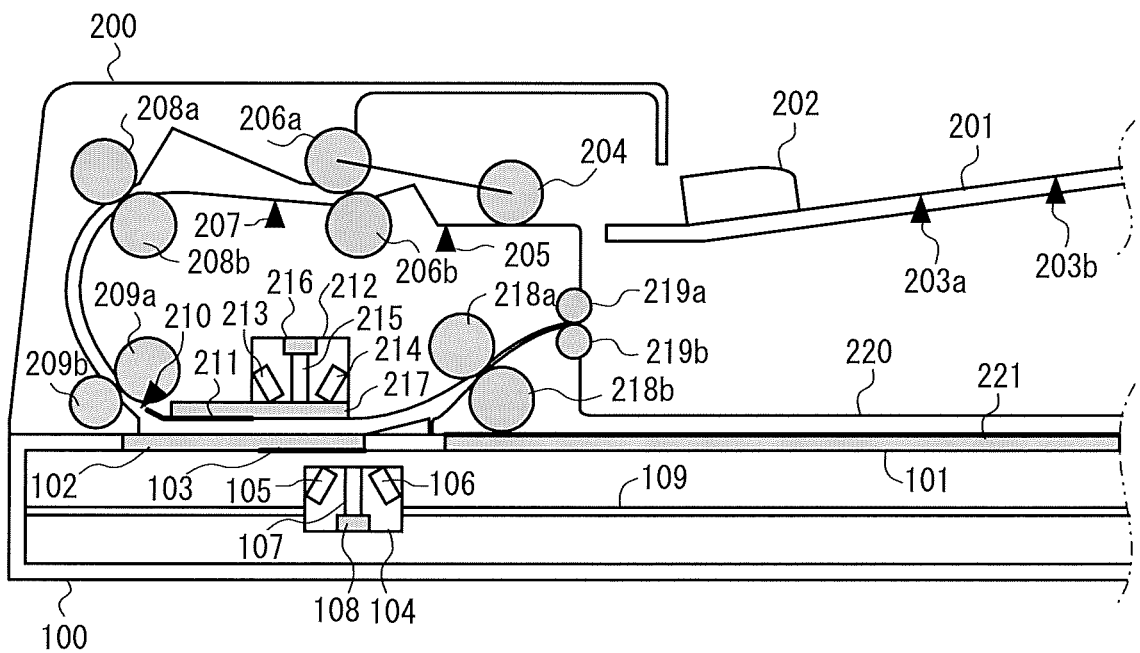

FIG. 2A and FIG. 2B are internal configuration diagrams for illustrating the image reading apparatus 100 and the ADF 200. FIG. 2A is an illustration of a configuration at the time of flow reading, and FIG. 2B is an illustration of a configuration at the time of standby.

Image Reading Apparatus

The image reading apparatus 100 includes, on an inner side thereof, a front-surface reader 104 serving as an image sensor, an optical motor (not shown), and a reading movement guide 109. In the case of platen cover reading, the image reading apparatus 100 reads a front surface of the original placed on the platen glass 101 one line by one line while using the optical motor to move the front-surface reader 104 along the reading movement guide 109. The original placed on the platen glass 101 is fixed by being pressed by the platen white plate 221 of the ADF 200 being closed. In the case of flow reading, the image reading apparatus 100 fixes the front-surface reader 104 at a flow reading position, and reads an original image from the original conveyed by the ADF 200 onto the front-surface flow reading glass 102.

The front-surface reader 104 includes front-surface light emitting portions 105 and 106, a front-surface lens array 107, and a front-surface line sensor 108. The front-surface light emitting portions 105 and 106 include a plurality of light emitting diodes (LEDs) or other light emitting elements. The front-surface light emitting portions 105 and 106 radiate light toward the original. The front-surface lens array 107 is an optical system configured by combining a plurality of lenses. The front-surface lens array 107 guides light (reflection light) emitted from the front-surface light emitting portions 105 and 106 and reflected by the original toward a light receiving surface of the front-surface line sensor 108. The front-surface line sensor 108 is a light receiving portion configured by arranging a plurality of light receiving elements into a line. The front-surface line sensor 108 outputs image data representing an original image on the front surface of the original in accordance with the reflection light received by light receiving surfaces of the light receiving elements. The light receiving elements of the front-surface line sensor 108 are arranged in a depth direction of FIG. 2A. The direction in which the light receiving elements are arranged corresponds to a main scanning direction of the front-surface reader 104.

ADF

The ADF 200 includes, on an inner side thereof, an original conveyance path, a back-surface reader 212 serving as an image sensor, and a back-surface flow reading glass 217. The back-surface flow reading glass 217 is provided between the conveyance path and the back-surface reader 212. A flow reading guide 211 is provided on the back-surface flow reading glass 217. The flow reading guide 211 is provided at the reading position of the front-surface reader 104 at the time of flow reading to secure the original conveyance path. In the following description, "upstream" and "downstream" respectively refer to "upstream" and "downstream" in the conveyance direction of the original.

On the original tray 201, an original stack formed of one or more originals can be stacked. The original tray 201 includes a regulation plate 202 for use to align the original stack in a direction orthogonal to the conveyance direction of the original (depth direction in FIG. 2A and FIG. 2B). The original tray 201 includes original length detection sensors 203a and 203b configured to detect the size of the original in the conveyance direction.

The originals are taken into the conveyance path one by one from the original tray 201. Therefore, the conveyance path includes, as original separating mechanisms, a separation roller pair 206a and 206b and a pick-up roller 204. The separation roller pair 206a and 206b is configured to regulate protrusion of the original stack from the original tray 201 and entrance to the downstream before the conveyance of the original is started. The original tray 201 includes an original presence/absence sensor 205 configured to detect the presence or absence of the original. The pick-up roller 204 descends to the uppermost surface of the original stack stacked on the original tray 201 and rotates when the original is to be conveyed to convey the uppermost original of the original stack. The uppermost original conveyed by the pick-up roller 204 is separately conveyed by the action of the separation roller pair 206a and 206b. The originals may be separated by a known separation technology.

The original separated by the separation roller pair 206a and 206b is conveyed to a registration roller pair 208a and 208b. At this time, the rotation of the registration roller pair 208a and 208b is stopped, and hence the original abuts against the registration roller pair 208a and 208b. The original forms a loop at a leading edge part thereof when abutting against the registration roller pair 208a and 208b. In this manner, skew feeding is corrected during original conveyance. Between the separation roller pair 206a and 206b and the registration roller pair 208a and 208b, a sheet feeding sensor 207 configured to detect the original is provided. An operation of rotating the registration roller pair 208a and 208b is controlled in accordance with the detection result of the sheet feeding sensor 207.

The rotation of the registration roller pair 208a and 208b is started after the skew feeding of the original is corrected. In this manner, the original passes through the registration roller pair 208a and 208b to be conveyed to an upstream-of-read roller pair 209a and 209b. The upstream-of-read roller pair 209a and 209b conveys the original to the reading position (flow reading position) of the front-surface reader 104 and the reading position of the back-surface reader 212. The reading position of the front-surface reader 104 is located between the front-surface flow reading glass 102 and the flow reading guide 211 of the back-surface flow reading glass 217. The reading position of the back-surface reader 212 is located between the back-surface flow reading glass 217 and the reference white plate 103 of the front-surface flow reading glass 102. Between the upstream-of-read roller pair 209a and 209b and the reading position of the front-surface reader 104, a read sensor 210 configured to detect the original is provided. Operations of the front-surface reader 104 and the back-surface reader 212 are controlled in accordance with the detection result of the read sensor 210.

When the front surface of the original is to be read, the original is irradiated with light by the front-surface light emitting portions 105 and 106 when passing between the front-surface flow reading glass 102 and the flow reading guide 211 of the back-surface flow reading glass 217. The front-surface line sensor 108 receives reflection light from the original via the front-surface lens array 107 to read the original image on the front surface of the original.

When the back surface of the original is to be read, the original is read by the back-surface reader 212 when passing between the back-surface flow reading glass 217 and the reference white plate 103 of the front-surface flow reading glass 102. The back-surface reader 212 has a configuration similar to that of the front-surface reader 104, and includes back-surface light emitting portions 213 and 214, a back-surface lens array 215, and a back-surface line sensor 216. The back-surface reader 212 is fixed to the ADF 200. The main scanning direction of the back-surface reader 212 and the main scanning direction of the front-surface reader 104 are the same, and are orthogonal to the conveyance direction of the original. The back-surface reader 212 irradiates the original with light by the back-surface light emitting portions 213 and 214 when the original passes between the back-surface flow reading glass 217 and the reference white plate 103 of the front-surface flow reading glass 102. The back-surface line sensor 216 receives the reflection light from the original via the back-surface lens array 215 to read the original image on the back surface of the original.

The original whose original image has been read is conveyed to a sheet discharge roller pair 219a and 219b by a downstream-of-read roller pair 218a and 218b. The sheet discharge roller pair 219a and 219b discharges the original onto the sheet discharge tray 220.

The front-surface reader 104 and the back-surface reader 212 are each achieved by a contact image sensor (CIS) or a charge coupled device (CCD) formed of a reduction optical system using a lens array and a mirror.

Controller

Figure 3:
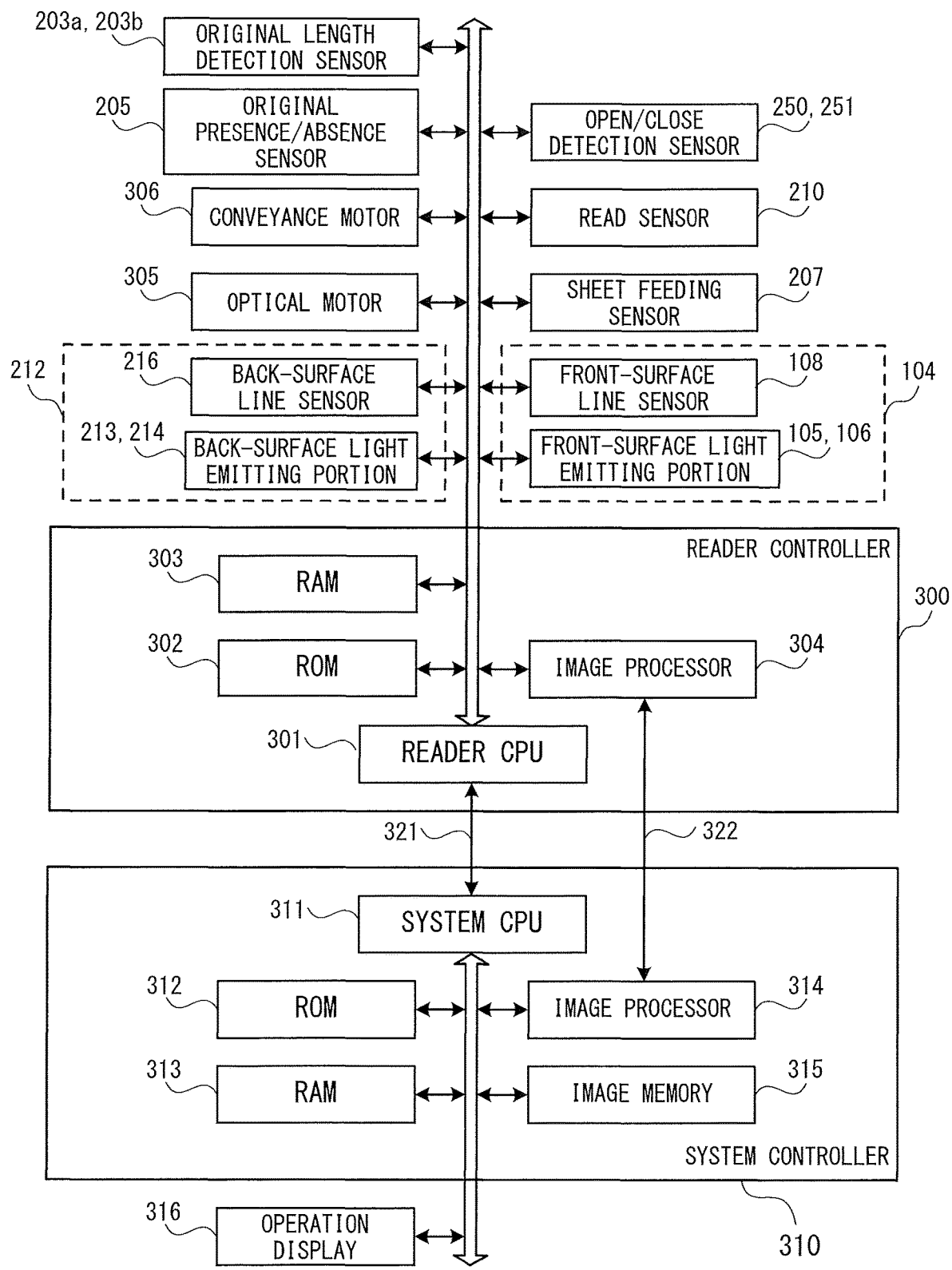
FIG. 3 is a configuration diagram for illustrating a controller.

FIG. 3 is a configuration diagram for illustrating a controller. The controller includes a reader controller 300 and a system controller 310. The reader controller 300 and the system controller 310 are connected to each other by a controller IF 321 and an image data bus 322, and operate in cooperation with each other. The reader controller 300 mainly controls the operations of the image reading apparatus 100 and the ADF 200. The system controller 310 performs, for example, image processing on the original image read by the front-surface reader 104 and the back-surface reader 212, and outputs the image data to external apparatus such as an image forming apparatus and a personal computer. Further, the system controller 310 receives various settings or instructions input by the user.

The reader controller 300 is a computer including a reader central processing unit (CPU) 301, a read only memory (ROM) 302, and a random access memory (RAM) 303. The reader CPU 301 executes a computer program stored in the ROM 302 with use of the RAM 303 as a work area to control the operations of the image reading apparatus 100 and the ADF 200. The reader controller 300 further includes an image processor 304 configured to perform image processing on the original image read by the front-surface reader 104 and the back-surface reader 212.

The reader CPU 301 is connected to a conveyance motor 306 configured to drive each roller for conveyance in order to implement an original conveyance function. The registration roller pair 208a and 208b and other rollers are connected to the conveyance motor 306 via a clutch configured to switch between drive and stop. In this embodiment, the conveyance motor 306 is a pulse motor. The reader CPU 301 controls the number of drive pulses to manage the pulse of the conveyance motor 306. The number of pulses represents a conveyance distance of the original being conveyed, and the reader CPU 301 controls each load or the like based on the conveyance distance calculated from the motor pulse to convey the original. The reader CPU 301 is connected to the original presence/absence sensor 205 configured to detect the originals stacked on the original tray 201, and to the sheet feeding sensor 207 and the read sensor 210 configured to detect an original edge portion on the conveyance path. The reader CPU 301 controls the operations of the conveyance motor 306, the front-surface reader 104, and the back-surface reader 212 in accordance with the detection results of the respective sensors.

The reader CPU 301 is connected to open/close detection sensors 250 and 251. The reader CPU 301 detects the open state and the closed state of the ADF 200 in accordance with the detection results of the open/close detection sensors 250 and 251. Details of the open/close detection sensors 250 and 251 are described later. The reader CPU 301 is connected to an optical motor 305. The reader CPU 301 can cause the optical motor 305 to move the front-surface reader 104 along the reading movement guide 109 at the time of platen cover reading.

The reader CPU 301 is connected to the front-surface light emitting portions 105 and 106, the back-surface light emitting portions 213 and 214, the front-surface line sensor 108, and the back-surface line sensor 216 in order to implement an image reading function. The front-surface line sensor 108 and the back-surface line sensor 216 transmit image data to the image processor 304 under control of the reader CPU 301. The image processor 304 performs various types of image processing including shading correction on the image data, and transmits the result of image processing to the system controller 310 via the image data bus 322. Further, the reader CPU 301 notifies the system controller 310 of a vertical synchronization signal, which serves as a reference of a leading end of the image data, and a horizontal synchronization signal, which serves as a reference of a pixel leading end of one line, via the controller IF 321 in synchronization with the timing to read the original. Further, the reader CPU 301 generates shading correction data for flow reading and shading correction data for platen cover reading based on the result of reading the reference white plate 103.

The system controller 310 is a computer including a system CPU 311, a ROM 312, and a RAM 313. The system CPU 311 executes a computer program stored in the ROM 312 with use of the RAM 313 as a work area to perform various types of processing. The system controller 310 further includes an image processor 314 and an image memory 315. The system CPU 311 transmits and receives data related to the image reading control to and from the reader CPU 301 via the controller IF 321. The image processor 314 acquires image data from the image processor 304 of the reader controller 300 via the image data bus 322. The image processor 314 performs predetermined image processing such as color determination on the acquired image data, and stores the result of image processing in the image memory 315.

The system controller 310 is connected to an operation display 316. The operation display 316 is a user interface. The operation display 316 includes various key buttons and a touch panel serving as an input device, and a display or the like serving as an output device. Instructions and the like input from the operation display 316 are input to the reader controller 300 via the system controller 310. For example, the operation display 316 displays an image under control of the system controller 310.

Open/Close Detection Sensors

Figure 4:
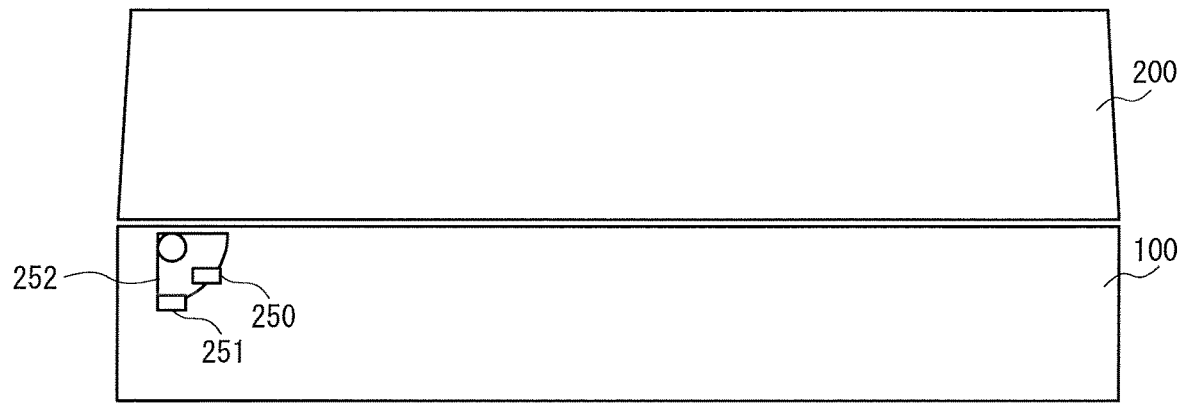
FIG. 4 is an explanatory diagram for illustrating open/close detection sensors.
Figure 5:
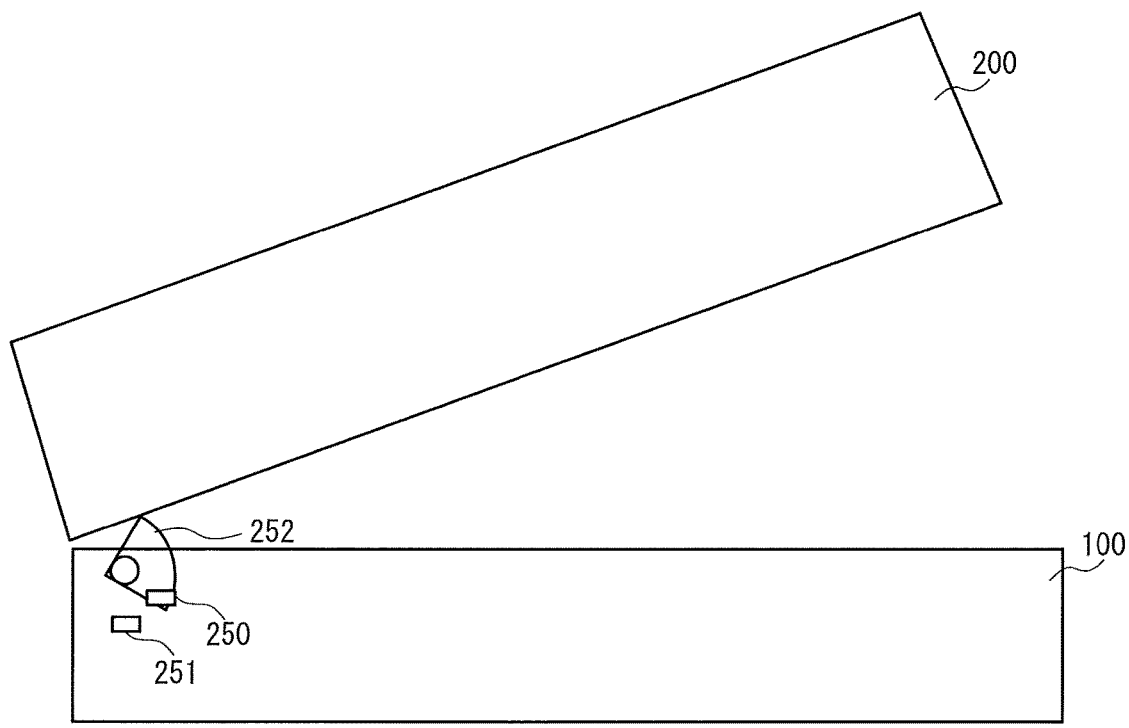
FIG. 5 is an explanatory diagram for illustrating the open/close detection sensors.
Figure 6:
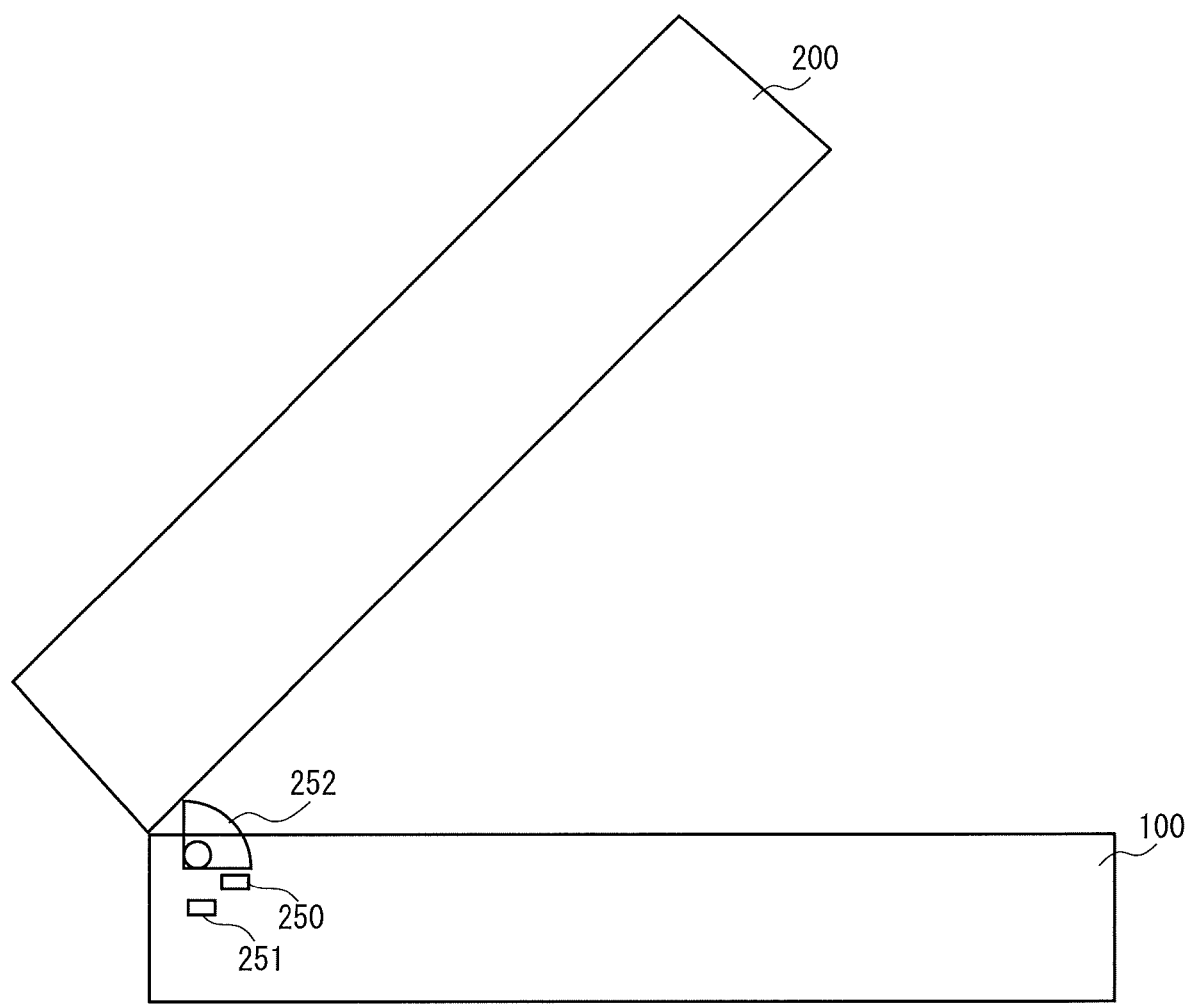
FIG. 6 is an explanatory diagram for illustrating the open/close detection sensors.

FIG. 4, FIG. 5, and FIG. 6 are explanatory diagrams for illustrating the open/close detection sensors 250 and 251. FIG. 4 is an illustration of a state in which the ADF 200 is closed. FIG. 5 is an illustration of a state in which the ADF 200 is half closed. FIG. 6 is an illustration of a state in which the ADF 200 is completely opened. The open/close detection sensors 250 and 251 detect such open and closed states of the ADF 200.

The open/close detection sensors 250 and 251 detect whether the ADF 200 is opened or closed based on a flag 252 configured to actuate along with the opening and the closing of the ADF 200. The flag 252 is detected by both of the open/close detection sensors 250 and 251 when the ADF 200 is in the closed state (FIG. 4). The flag 252 is detected by the open/close detection sensor 250 but is not detected by the open/close detection sensor 251 when the ADF 200 is half closed (FIG. 5). The flag 252 is detected by neither of the open/close detection sensor 250 nor the open/close detection sensor 251 when the ADF 200 is completely in the open state (FIG. 6). As described above, the open and closed states of the ADF 200 are represented by the detection results of both of the open/close detection sensors 250 and 251.

The open/close detection sensors 250 and 251 are formed of, for example, photo-interrupters. Whether or not the flag 252 is detected is determined based on whether or not an optical path of the photo-interrupter is interrupted by the flag 252. The reader CPU 301 detects the open and closed states of the ADF 200 based on the state of the optical path of the photo-interrupter. The open/close detection sensors 250 and 251 and the flag 252 serve as an open/close detection mechanism for the ADF 200. Even when a member (platen cover) for pressing the original placed on the platen glass 101 is mounted instead of the ADF 200, with use of an open/close detection mechanism having a similar configuration, the open and closed states of the platen cover can be detected.

Image Reading Control

Description is given of image reading processing to be performed by the image reading apparatus 100 and the ADF 200 having the above-mentioned configurations. FIG. 7, FIG. 8, FIG. 9, and FIG. 10 are flow charts for illustrating the image reading processing. This processing is processing for the front-surface reader 104. Details of control of the front-surface reader 104 are changed depending on the opening and closing of the ADF 200 and the presence or absence of the original on the original tray 201 at the time of start of reading of the original. When the original is placed on the original tray 201, the following use cases may be assumed. One is a case in which the user opens and closes the ADF 200 for recovery when jamming occurs, and another is a case in which the user checks whether the original is left on the platen glass 101 after the original is placed on the original tray 201. In those use cases, in this embodiment, the shading correction data for flow reading is first generated. FIG. 11A to FIG. 11D are explanatory diagrams for illustrating the change in position of the front-surface reader 104 at the time of flow reading. FIG. 12A to FIG. 12D are explanatory diagrams for illustrating the change in position of the front-surface reader 104 at the time of platen cover reading.

Figure 7:
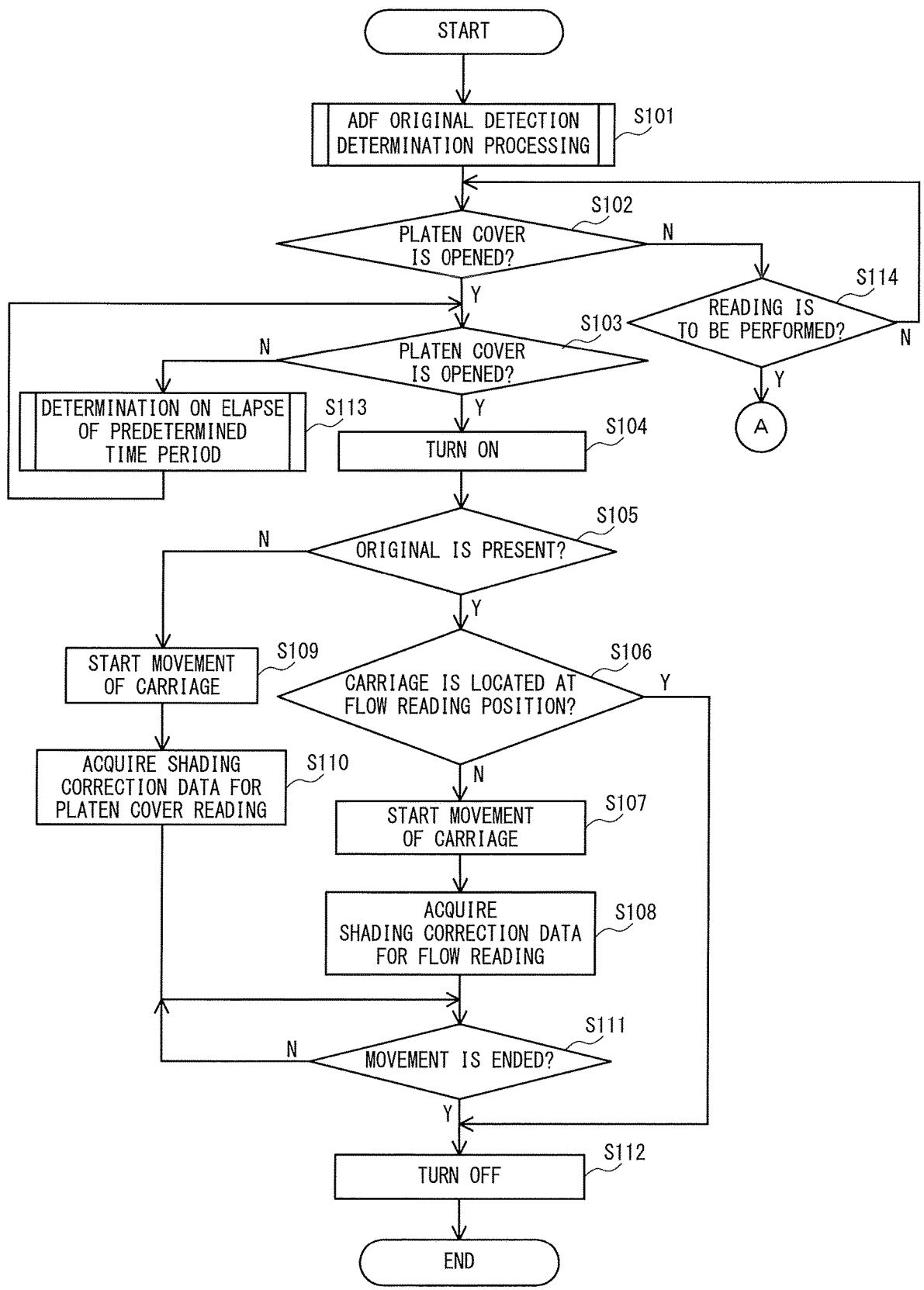
FIG. 7 is a flow chart for illustrating image reading processing.

FIG. 7 is an illustration of processing to be executed in accordance with detection of opening and closing of the ADF 200 and detection of the original before image reading is executed.

The reader CPU 301 performs original detection determination processing of the ADF 200 (Step S101). The original detection determination processing is described in detail later. The reader CPU 301 causes the open/close detection sensors 250 and 251 to detect whether or not the ADF 200 is in the opened state (Step S102). The ADF 200 is hereinafter referred to as "platen cover". As illustrated in FIG. 2B, the ADF 200 includes the platen cover white plate 221. The open and closed states of the ADF 200 are the same as the open and closed states of the platen cover (platen cover white plate 221).

When the platen cover is in the closed state (Step S102: N), the reader CPU 301 checks whether or not an instruction to start reading is issued (Step S114). The instruction to start reading is issued when the user operates the operation display 316, and is input to the reader CPU 301 via the system CPU 311. When the instruction to start reading is not issued (Step S114: N), the reader CPU 301 returns to the processing of Step S102. When the instruction to start reading is issued (Step S114: Y), the reader CPU 301 performs a reading operation to be described later. That is, the reader CPU 301 waits for any one of the open state of the platen cover and the instruction to start reading after the original detection determination processing of the ADF 200 is performed.

When the platen cover is brought to the open state (Step S102: Y), the reader CPU 301 causes the open/close detection sensors 250 and 251 to detect whether or not the platen cover is brought to the closed state (Step S103). When the platen cover is still in the open state (Step S103: N), the reader CPU 301 performs processing of determining elapse of a predetermined time period to be described later (Step S113), and detects whether or not the platen cover is brought to the closed state again. That is, the reader CPU 301 performs the processing of determining elapse of a predetermined time period unless the ADF 200 is brought to the open state and then is brought to the closed state. When the platen cover is brought to the closed state (Step S103: Y), the reader CPU 301 turns on the front-surface light emitting portions 105 and 106 (Step S104). That is, when the ADF 200 is brought to the open state and then is brought to the closed state, the reader CPU 301 causes the front-surface reader 104 to emit light. After the front-surface reader 104 emits light, the reader CPU 301 causes the original presence/absence sensor 205 to detect the presence or absence of the original on the original tray 201 (Step S105).

When the original is placed on the original tray 201 (Step S105: Y), the reader CPU 301 determines whether or not the front-surface reader 104 is located at the flow reading position, which is right below the front-surface flow reading glass 102 and the flow reading guide 211 illustrated in FIG. 2A (Step 106). This case means that the original is placed on the original tray 201, and the ADF 200 is once opened and then is closed. That is, this case corresponds to a case in which, after the original is placed on the original tray 201, the user checks whether the original is left on the platen glass 101. In the following description, the front-surface reader 104 is referred to as "carriage".

In this embodiment, as illustrated in FIG. 2A and FIG. 2B, the front-surface light emitting portions 105 and 106, the front-surface lens array 107, and the front-surface line sensor 108 are arranged on the carriage being the front-surface reader 104. However, there may be employed a configuration in which the front-surface line sensor is fixed to a predetermined position, and a mirror and a light emitting portion are moved to move a reading position at which the front-surface line sensor performs the reading.

Figure 11A:
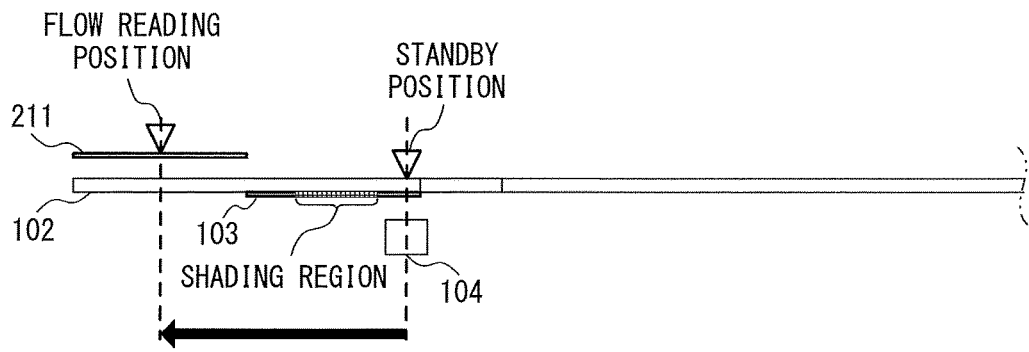
FIG. 11A, FIG. 11B, FIG. 11C, and FIG. 11D are explanatory diagrams for illustrating change in position of a front-surface reader at the time of flow reading.
Figure 11B:
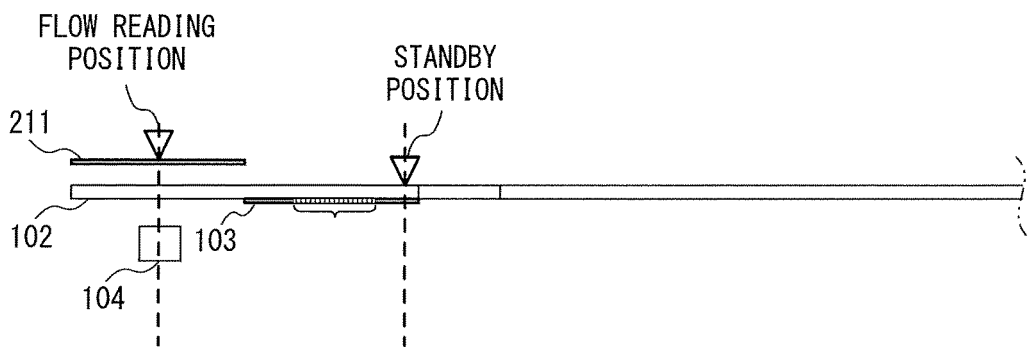

When the carriage is not located at the flow reading position (Step 106: N), the reader CPU 301 causes the optical motor 305 to start the movement of the carriage to the flow reading position (Step S107). FIG. 11A is an illustration of a situation in which the carriage starts to move to the flow reading position from a standby position. While the carriage is moving toward the flow reading position, the reader CPU 301 executes the shading correction for flow reading to acquire the shading correction data (Step S108). That is, the reader CPU 301 executes the shading correction for flow reading while the carriage is moving in a shading region illustrated in FIG. 11A and FIG. 11B. When a glass surface of the front-surface flow reading glass 102 is subjected to antistatic or dustproof processing such as charge coating, a read image becomes dark. Therefore, in order to obtain the same value as the image read by the platen glass 101, the value of the shading correction data for flow reading is obtained by multiplying the value of the shading correction data for platen cover reading by a predetermined coefficient.

The reader CPU 301 waits until the movement of the carriage to the flow reading position is completed after the shading correction data is generated (Step S111: N). After the movement of the carriage to the flow reading position is completed (Step S111: Y), the reader CPU 301 turns off the front-surface light emitting portions 105 and 106 to end the processing (Step S112). When the carriage is located at the flow reading position (Step S106: Y), the reader CPU 301 turns off the front-surface light emitting portions 105 and 106 without performing new shading correction for flow reading to end the processing (Step S112).

As described above, according to this embodiment, even when the platen cover is changed from the open state (Step S103: Y), in a case where the original is present on the original tray 201, the shading correction data for platen cover reading is not generated. Thus, generation of unrequired shading correction data, which has been performed in the related art, can be prevented.

When no original is placed on the original tray 201 (Step S105: N), the reader CPU 301 causes the optical motor 305 to start the movement of the carriage to an acceleration start position illustrated in FIG. 12A (Step S109). The acceleration start position is a position at which the front-surface reader 104 is arranged when the platen cover reading is started. This case means that the ADF 200 is once opened and then is closed without the original being placed on the original tray 201. That is, this case corresponds to a case in which the user opens and closes the platen cover for recovery when jamming occurs. The reader CPU 301 executes shading correction for platen cover reading while the carriage is moving toward the acceleration start position to acquire the shading correction data (Step S110). That is, the reader CPU 301 generates the shading correction data for platen cover reading while the carriage is moving in a shading region illustrated in FIG. 12A and FIG. 12B. The reader CPU 301 waits until the movement of the carriage to the acceleration start position is completed after the shading correction is executed (Step S111: N). After the movement of the carriage to the acceleration start position is completed (Step S111: Y), the reader CPU 301 turns off the front-surface light emitting portions 105 and 106 to end the processing (Step S112). The processing of from Step S103 to Step S112 is performed before the image reading is performed.

Figure 8:
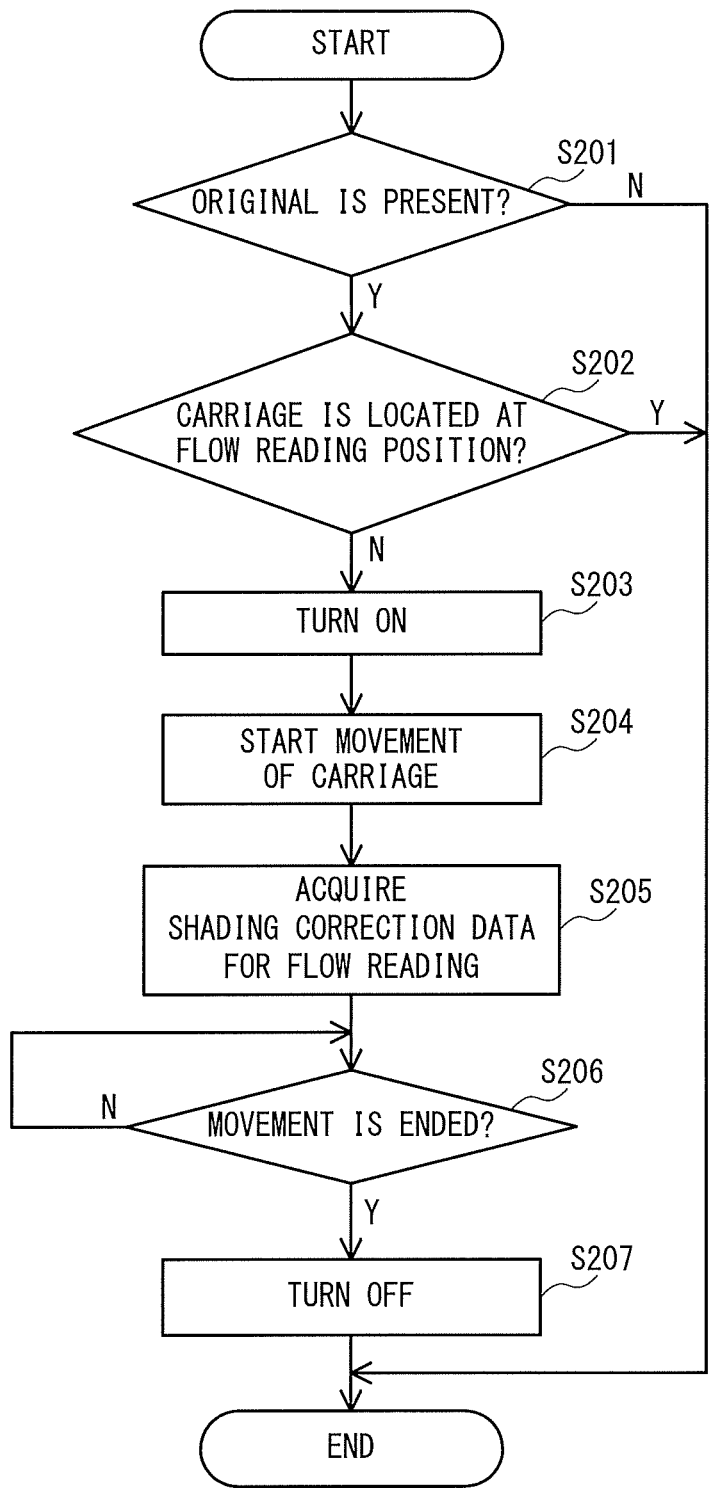
FIG. 8 is a flow chart for illustrating the image reading processing.

FIG. 8 is an illustration of the original detection determination processing of the ADF 200, which is performed in Step S101.

The reader CPU 301 causes the original presence/absence sensor 205 to detect the presence or absence of the original on the original tray 201 (Step S201). When no original is placed on the original tray 201 (Step S201: N), the reader CPU 301 ends the original detection determination processing. When the original is placed on the original tray 201 (Step S201: Y), the reader CPU 301 determines whether or not the carriage is located at the flow reading position (Step S202). When the carriage is located at the flow reading position (Step S202: Y), the reader CPU 301 ends the original detection determination processing. When the carriage is not located at the flow reading position (Step S202: N), the reader CPU 301 turns on the front-surface light emitting portions 105 and 106 (Step S203).

The reader CPU 301 causes the optical motor 305 to start the movement of the carriage to the flow reading position (Step S204). The reader CPU 301 executes the shading correction for flow reading while the carriage is moving toward the flow reading position to acquire the shading correction data (Step S205). The reader CPU 301 waits until the movement of the carriage to the flow reading position is completed after the shading correction is executed (Step S206: N). After the movement of the carriage to the flow reading position is completed (Step S206: Y), the reader CPU 301 turns off the front-surface light emitting portions 105 and 106 to end the processing (Step S207). That is, when the original is placed on the original tray 201, the reader CPU 301 can acquire the shading correction data for flow reading before the opening and closing of the ADF 200 and the instruction to start reading.

Figure 9:
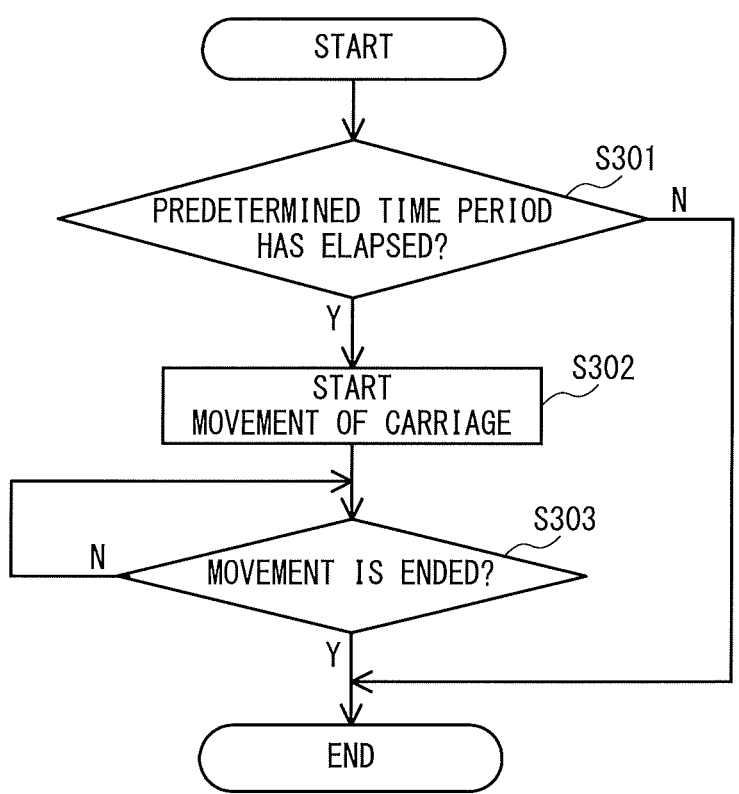
FIG. 9 is a flow chart for illustrating the image reading processing.

FIG. 9 is an illustration of the processing of determining elapse of a predetermined time period, which is performed in Step S113.

The reader CPU 301 determines whether or not a predetermined time period has elapsed after the platen cover is brought to the open state without being brought to the closed state (Step S301). When the predetermined time period has not elapsed (Step S301: N), the reader CPU 301 ends the processing, and waits until the predetermined time period elapses while determining whether or not the platen cover is brought to the closed state. When the predetermined time period has elapsed without the platen cover being brought to the closed state (Step S301: Y), as illustrated in FIG. 2B, the reader CPU 301 causes the optical motor 305 to start the movement of the carriage to an end portion of the reference white plate 103 (Step S302). The end portion of the reference white plate 103 corresponds to a home position (HP) serving as the standby position of the carriage. The reader CPU 301 waits until the movement of the carriage to the HP is completed (Step S303: N). The reader CPU 301 ends the processing after the movement of the carriage to the HP is completed (Step S303: Y). The standby position (HP) to which the carriage moves is set to a position close to the reference white plate 103 so that the shading correction data can be generated at the shortest time.

Figure 10:
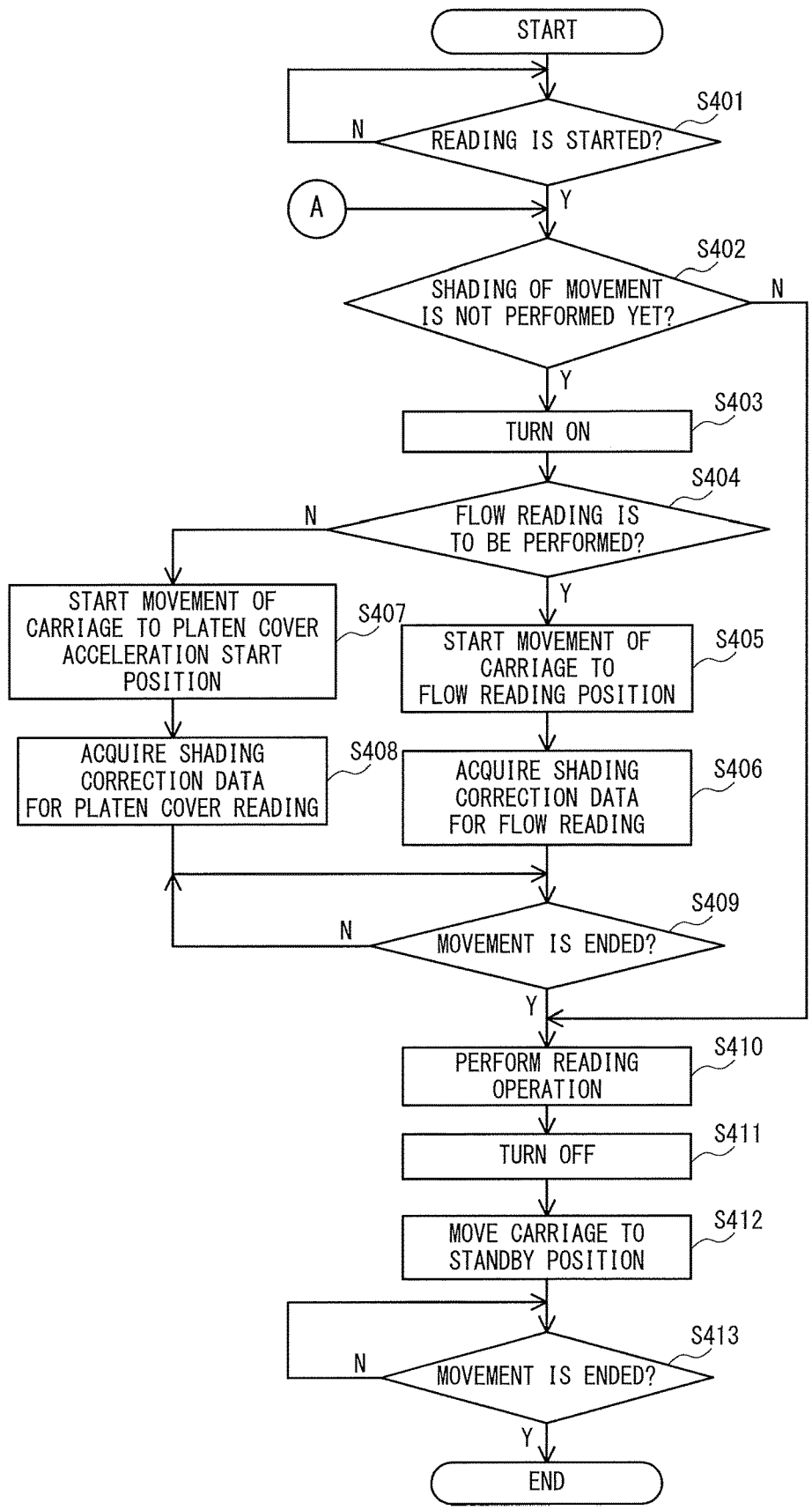
FIG. 10 is a flow chart for illustrating the image reading processing.

FIG. 10 is an illustration of the processing of a case in which the instruction to start reading is issued in the processing of Step S114.

The reader CPU 301 waits until the instruction to start reading is issued (Step S401: N). When the instruction to start reading is issued (Step S401: Y), the reader CPU 301 determines whether or not the apparatus is in a state in which the shading correction data is not generated or a state in which the carriage is not moved (state in which the carriage waits at the HP) (Step S402). When the apparatus is in the state in which the shading correction data is not generated or the state in which the carriage is not moved (Step S402: Y), the reader CPU 301 first turns on the front-surface light emitting portions 105 and 106 to perform shading correction (Step S403). The reader CPU 301 that has turned on the front-surface light emitting portions 105 and 106 determines whether or not the instruction to start reading is an instruction for flow reading (Step S404).

When the instruction for flow reading is issued (Step S404: Y), the reader CPU 301 causes the optical motor 305 to start the movement of the carriage to the flow reading position (Step S405). In this manner, the carriage starts to move as illustrated in FIG. 11A. The reader CPU 301 acquires the shading correction data for flow reading while the carriage is moving toward the flow reading position (Step S406). The reader CPU 301 generates the shading correction data for flow reading while the carriage is moving in the shading region illustrated in FIG. 11A and FIG. 11B. The reader CPU 301 waits until the movement of the carriage to the flow reading position is completed after the shading correction data is generated (Step S409: N).

Figure 11C:
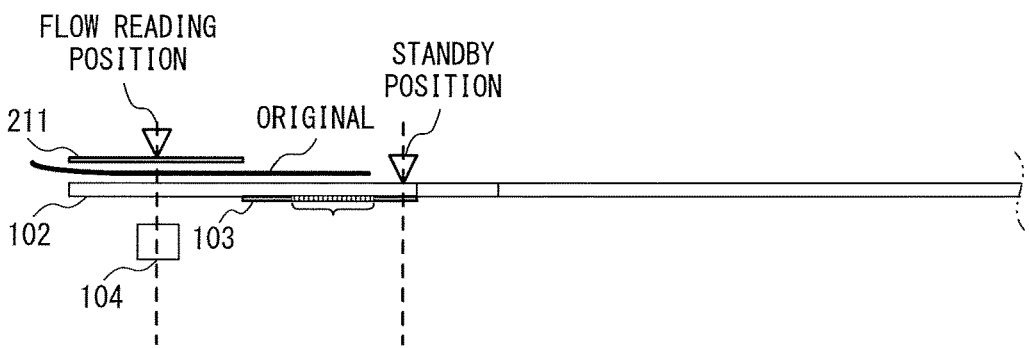
Figure 11D:
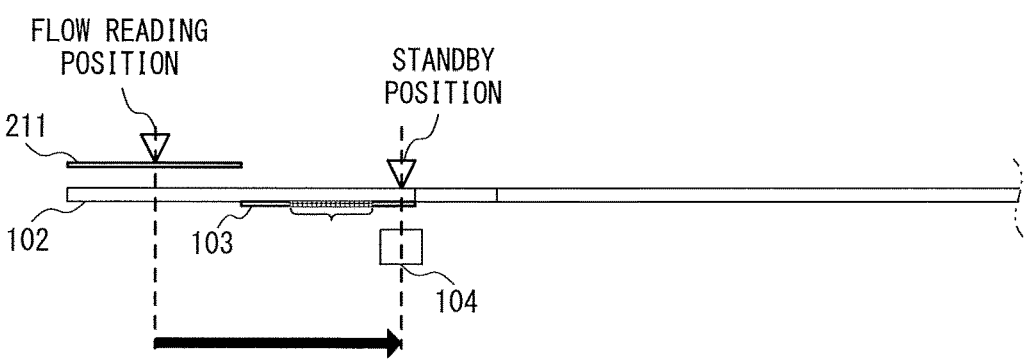

After the movement of the carriage to the flow reading position is completed (Step S409: Y), the reader CPU 301 performs an original reading operation. Then, the image processor 304 performs shading correction on the obtained original image data with use of the shading correction data for flow reading (Step S410). As illustrated in FIG. 11C, the ADF 200 conveys the original from the original tray 201 to the flow reading position. The front-surface reader 104 performs the reading operation at the timing at which the original passes through the flow reading position. When the reading processing is ended for all of the originals, the reader CPU 301 turns off the front-surface light emitting portions 105 and 106 (Step S411), and as illustrated in FIG. 11D, the optical motor 305 starts the movement of the carriage to the standby position (Step S412). The reader CPU 301 waits until the movement of the carriage to the standby position is ended (Step S413: N), and after the movement is ended, the reader CPU 301 ends the processing (Step S413: Y).

Figure 12A:
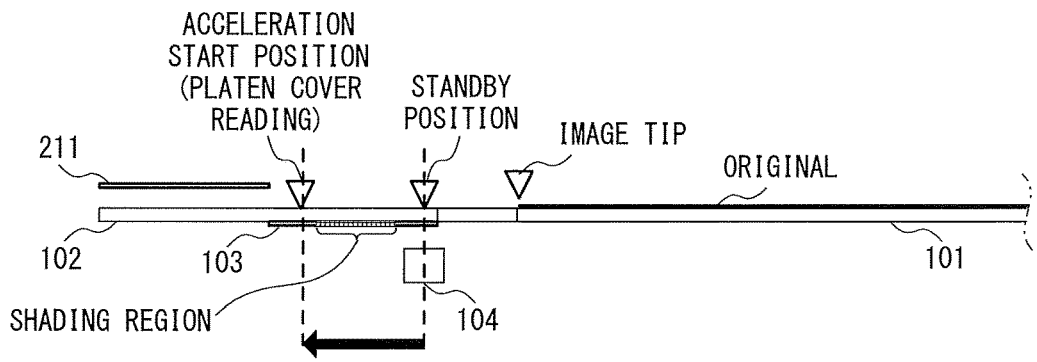
FIG. 12A, FIG. 12B, FIG. 12C, and FIG. 12D are explanatory diagrams for illustrating change in position of the front-surface reader at the time of platen cover reading.
Figure 12B:
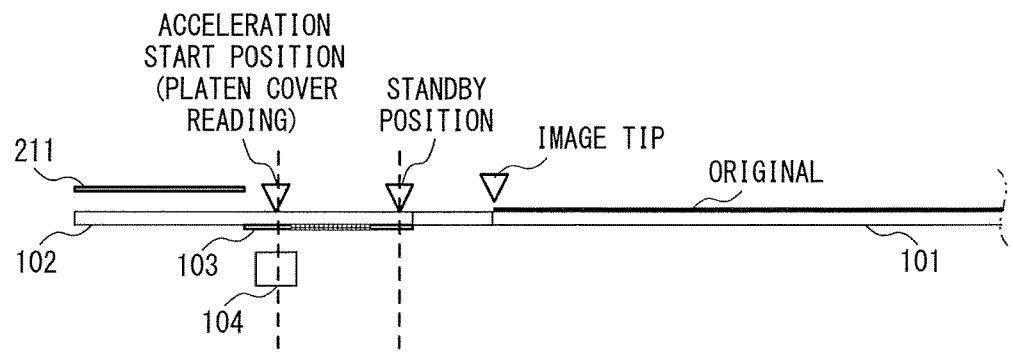

When the instruction for flow reading is not issued but the instruction for platen cover reading is issued (Step S404: N), the reader CPU 301 causes the optical motor 305 to start the movement of the carriage to the acceleration start position (Step S407). In this manner, the carriage starts to move as illustrated in FIG. 12A. The reader CPU 301 executes the shading correction for platen cover reading while the carriage is moving toward the acceleration start position to acquire the shading correction data (Step S408). The reader CPU 301 generates the shading correction data for platen cover reading while the carriage is moving in the shading region illustrated in FIG. 12A and FIG. 12B. The reader CPU 301 waits until the movement of the carriage to the acceleration start position is completed after the shading correction data is generated (Step S409: N).

Figure 12C:
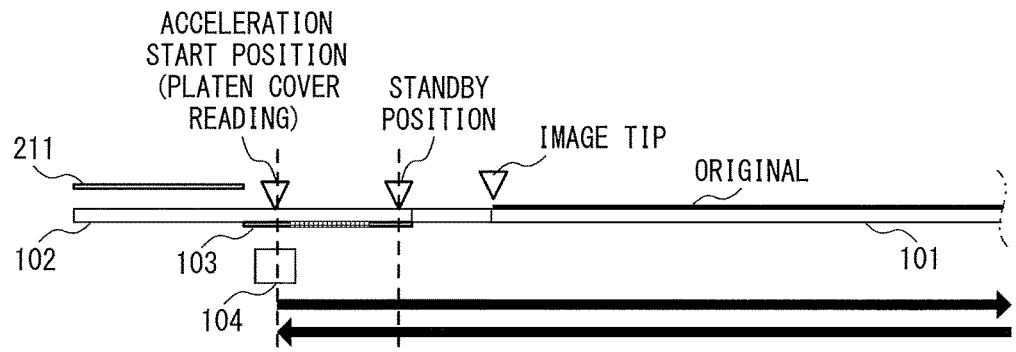
Figure 12D:
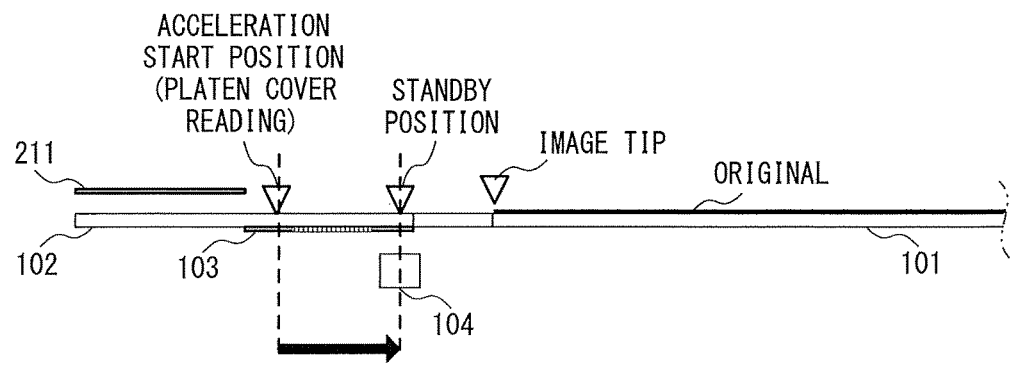

After the movement of the carriage to the acceleration start position is completed (Step S409: Y), the reader CPU 301 performs the original reading operation while the carriage is moved below the original. Then, the image processor 304 performs shading correction on the original image data output from the line sensor of the carriage with use of the shading correction data for platen cover reading (Step S410). While the carriage is moved in the arrow direction as illustrated in FIG. 12C, the front-surface reader 104 reads the original on the platen glass 101 from an image tip position. After the carriage is moved to the trailing edge of the original and the original reading processing is ended, the reader CPU 301 causes the optical motor 305 to return the carriage to the acceleration start position. In this manner, the reading of the original is completed. After the original reading processing is ended, the reader CPU 301 turns off the front-surface light emitting portions 105 and 106 (Step S411), and as illustrated in FIG. 12D, causes the optical motor 305 to start the movement of the carriage to the standby position (Step S412). The reader CPU 301 waits until the movement of the carriage to the standby position is ended (Step S413: N), and after the movement is ended, the reader CPU 301 ends the processing (Step S413: Y).

When the shading correction and the movement of the carriage have already been performed (Step S402: N), the reader CPU 301 causes the front-surface reader 104 to read the original with the carriage staying still (Step S410). After the original reading processing is ended, the reader CPU 301 turns off the front-surface light emitting portions 105 and 106 (Step S411), and the reader CPU 301 causes the optical motor 305 to start the movement of the carriage to the standby position (Step S412). The reader CPU 301 waits until the movement of the carriage to the standby position is ended (Step S413: N), and after the movement is ended, the reader CPU 301 ends the processing (Step S413: Y).

Operation Timing

Figure 13:
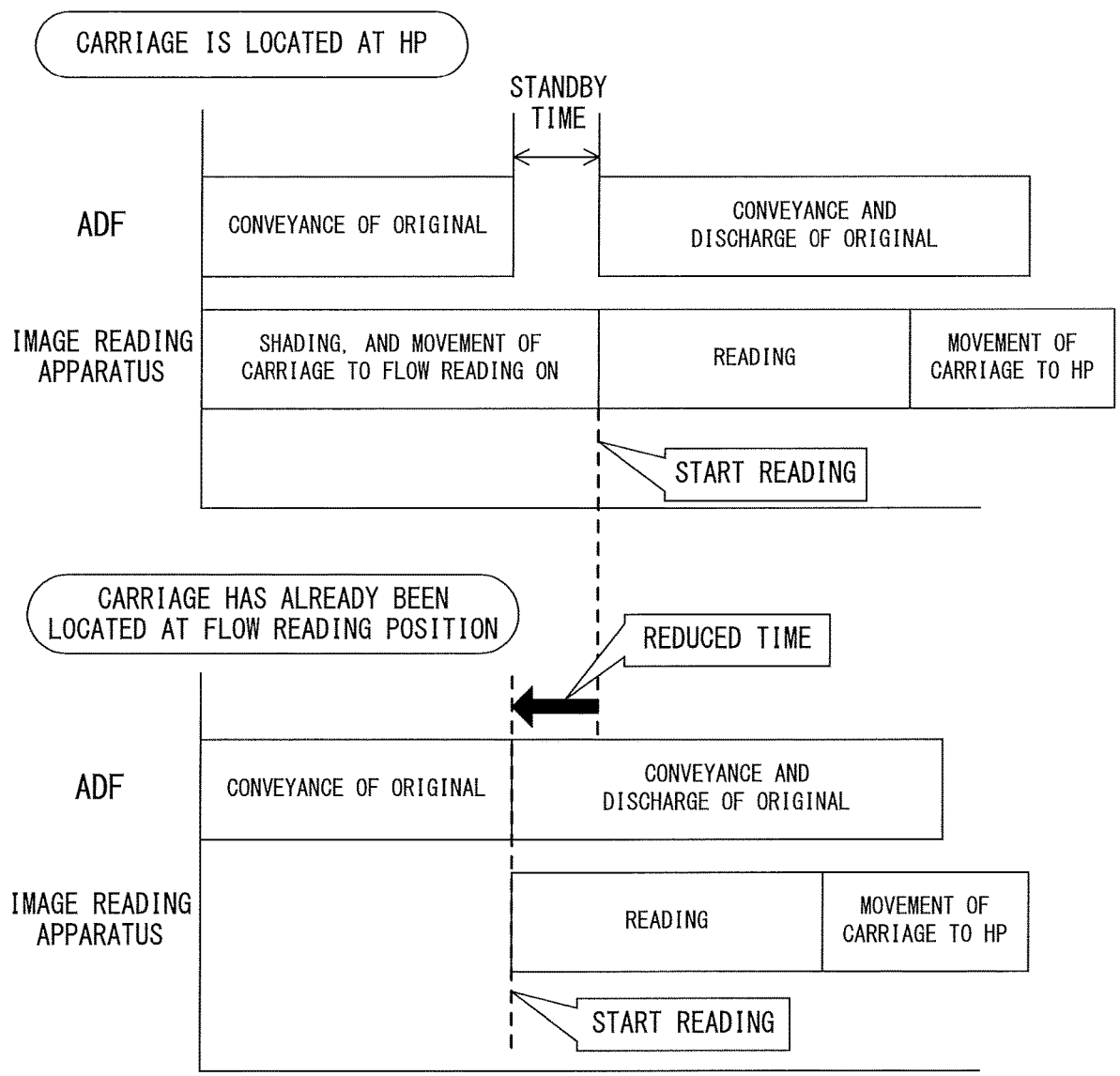
FIG. 13 is a timing chart for illustrating operations of the image reading apparatus and the ADF.

FIG. 13 is a timing chart for illustrating the operations of the image reading apparatus 100 and the ADF 200. FIG. 13 is an illustration of a difference in processing time between a case in which the carriage is located at the HP before the flow reading is performed and a case in which the carriage is located at the flow reading position before the flow reading is performed. In this embodiment, before the flow reading is performed, the processing in Step S107 and the subsequent steps (see FIG. 7) or the processing in Step S204 and the subsequent steps (see FIG. 8) is performed. Thus, the carriage has already been moved to the flow reading position.

When the carriage is located at the HP, the image reading apparatus 100 and the ADF 200 operate at the following timing. The ADF 200 conveys the original. The ADF 200 is required to wait until the processing on the image reading apparatus 100 side is ended, and hence the ADF 200 causes the original to once stop right before the original passes through the flow reading position. When the preparation processing of the image reading apparatus 100 before the reading (generation of the shading correction data and movement of the carriage) is ended, the ADF 200 restarts the conveyance of the original. After the conveyance of the original is restarted, the image reading apparatus 100 causes the front-surface reader 104 to read the original. The ADF 200 discharges the original after the reading is ended. The image reading apparatus 100 moves the carriage to the HP after the reading is ended.

When the carriage has already been located at the flow reading position, the image reading apparatus 100 and the ADF 200 operate at the following timing. The preparation processing of the image reading apparatus 100 before the reading (generation of the shading correction data and movement of the carriage) is ended, and hence the ADF 200 is not required to stop the original right before the flow reading position after the conveyance of the original is started. The original is directly conveyed, and thus the processing time can be reduced without causing a standby time. Therefore, the time required from the start of the reading of the first original to the output of the image data representing the read original image can be reduced.

As described above, when the original is present on the original tray 201 of the ADF 200, even when the ADF 200 (platen cover) is opened and closed, the shading correction for flow reading is performed without generating the shading correction data for platen cover reading. The front-surface reader 104 serving as the image sensor configured to read the front surface is moved to the flow reading position at this time, and hence an unnecessary operation can be omitted. That is, in the image reading apparatus 100 and the ADF 200 in this embodiment, the image reading apparatus 100 is controlled based on results of detection of the opening and closing of the ADF 200 and detection of the original so that the shading correction data for flow reading is first generated. In this case, the movement of the carriage from the HP to the flow reading position has already been completed, and hence an unnecessary operation before the reading operation can be omitted, and the time required from the start of the reading of the first original to the output of the image data representing the read original image can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-233388, filed Dec. 5, 2017 which is hereby incorporated by reference herein in its entirety.

What is claimed is:

1. An image reading apparatus, comprising:
   an original table on which an original is to be placed;
   a document feeder configured to convey the original, the document feeder including:
      an original tray on which the original is to be placed;
      a first sensor configured to detect that the original is placed on the original tray;
      a conveyor configured to convey the original placed on the original tray; and
      a sheet discharge tray to which the original is to be discharged;
   a reference member;
   a second sensor configured to detect an open state and a closed state of the document feeder;
   a reading unit configured to read one of the original placed on the original table and the original to be conveyed by the document feeder,
      the reading unit being configured to read the original placed on the original table under a state in which the reading unit is moving a reading position in a first mode, and to read the original to be conveyed by the conveyor to a predetermined reading position in a second mode;
   an image processor configured to perform shading correction on image data output from the reading unit in the first mode with use of first shading correction data, and to perform shading correction on image data output from the reading unit in the second mode with use of second shading correction data; and
   a processor configured to generate one of the first shading correction data for the first mode and the second shading correction data for the second mode based on a result of reading the reference member by the reading unit,
   wherein, in a case where the first sensor detects that no original is placed on the original tray and the second sensor detects that the original table is changed from the open state, the processor generates the first shading correction data, and
   wherein, in a case where the first sensor detects that the original is placed on the original tray and the second sensor detects that the original table is changed from the open state, the processor is prevented from generating the first shading correction data.

2. The image reading apparatus according to claim 1, wherein the reference member is arranged between the predetermined reading position and a region of the original table in which the original is to be placed, in a movement direction of the reading position.

3. The image reading apparatus according to claim 1, wherein, in a case where the first sensor detects that the original is placed on the original tray, the processor generates the second shading correction data.

* * * * *